(12) United States Patent
Wilkinson

(10) Patent No.: US 9,130,825 B2
(45) Date of Patent: *Sep. 8, 2015

(54) CONFIDENCE INTERVALS FOR KEY PERFORMANCE INDICATORS IN COMMUNICATION NETWORKS

(75) Inventor: Robert Todd Wilkinson, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 806 days.

This patent is subject to a terminal disclaimer.

(21) Appl. No.: 13/452,008

(22) Filed: Apr. 20, 2012

(65) Prior Publication Data

US 2013/0166730 A1 Jun. 27, 2013

Related U.S. Application Data

(60) Provisional application No. 61/580,502, filed on Dec. 27, 2011.

(51) Int. Cl.
*G06F 15/173* (2006.01)
*H04L 12/26* (2006.01)
*H04L 12/24* (2006.01)

(52) U.S. Cl.
CPC ............ *H04L 43/024* (2013.01); *H04L 41/142* (2013.01); *H04L 41/5009* (2013.01); *H04L 43/0852* (2013.01); *H04L 43/16* (2013.01)

(58) Field of Classification Search
CPC .. H04L 43/16; H04L 41/5009; H04L 43/0852
USPC ........................................ 709/224, 223, 226
See application file for complete search history.

(56) References Cited

U.S. PATENT DOCUMENTS

| 7,027,621 | B1 * | 4/2006 | Prokoski ...................... 382/118 |
| 2002/0129157 | A1 * | 9/2002 | Varsano ....................... 709/232 |
| 2003/0079160 | A1 * | 4/2003 | McGee et al. ................. 714/39 |
| 2003/0110007 | A1 * | 6/2003 | McGee et al. ................ 702/179 |

(Continued)

OTHER PUBLICATIONS

W. Ma et al., "Adaptive Sampling for Network Performance Measurement Under Voice Traffic", IEEE Communications Society, pp. 1129-1134 (2004).

(Continued)

*Primary Examiner* — Hieu Hoang
(74) *Attorney, Agent, or Firm* — Locke Lord LLP; Scott D. Wofsy; Christopher J. Capelli

(57) ABSTRACT

Systems and methods for calculating and presenting confidence interval(s) for key performance indicator(s) (KPIs) are described. For example, in some embodiments, a method may include identifying vectors representing network events observed by a network monitoring system, each vector including: a dimension, an indication of a sampling ratio with which a respective event was observed, and a value associated with the dimension. The method may also include calculating a KPI corresponding to the observed events for the dimension based, at least in part, upon the values. The method may further include calculating a confidence associated with the KPI, based, at least in part, upon the sampling ratios. In some cases, events may be observed with different sampling ratios. Additionally or alternatively, sampling ratios may include adaptive sampling ratios controlled by the network monitoring system in response to network or resource loading (e.g., subject varying over time), whitelist differentiated sampling ratios, etc.

15 Claims, 2 Drawing Sheets

(56) References Cited

U.S. PATENT DOCUMENTS

| | | | |
|---|---|---|---|
| 2004/0133395 A1* | 7/2004 | Ding et al. | 702/182 |
| 2005/0270985 A1* | 12/2005 | Hao et al. | 370/252 |
| 2006/0073013 A1* | 4/2006 | Emigholz et al. | 416/35 |
| 2006/0074598 A1* | 4/2006 | Emigholz et al. | 702/185 |
| 2007/0105544 A1* | 5/2007 | Veres et al. | 455/423 |
| 2007/0250292 A1* | 10/2007 | Alagappan et al. | 702/184 |
| 2008/0034313 A1* | 2/2008 | Hildebrand | 715/772 |
| 2008/0097637 A1* | 4/2008 | Nguyen et al. | 700/110 |
| 2009/0043539 A1* | 2/2009 | Frank et al. | 702/183 |
| 2009/0281839 A1* | 11/2009 | Lynn et al. | 705/3 |
| 2010/0150004 A1 | 6/2010 | Duffield et al. | |
| 2012/0022700 A1* | 1/2012 | Drees et al. | 700/276 |
| 2012/0116696 A1* | 5/2012 | Wank | 702/58 |
| 2015/0051749 A1* | 2/2015 | Hancock et al. | 700/295 |

OTHER PUBLICATIONS

"Throughput Testing Guidelines", ETSI Draft: European Telecommunications Standards Institute (ETSI), pp. 1-21 (May 18, 2011).

European Search Report issued on Mar. 19, 2013 in corresponding European Patent Application No. 12199490.9.

* cited by examiner

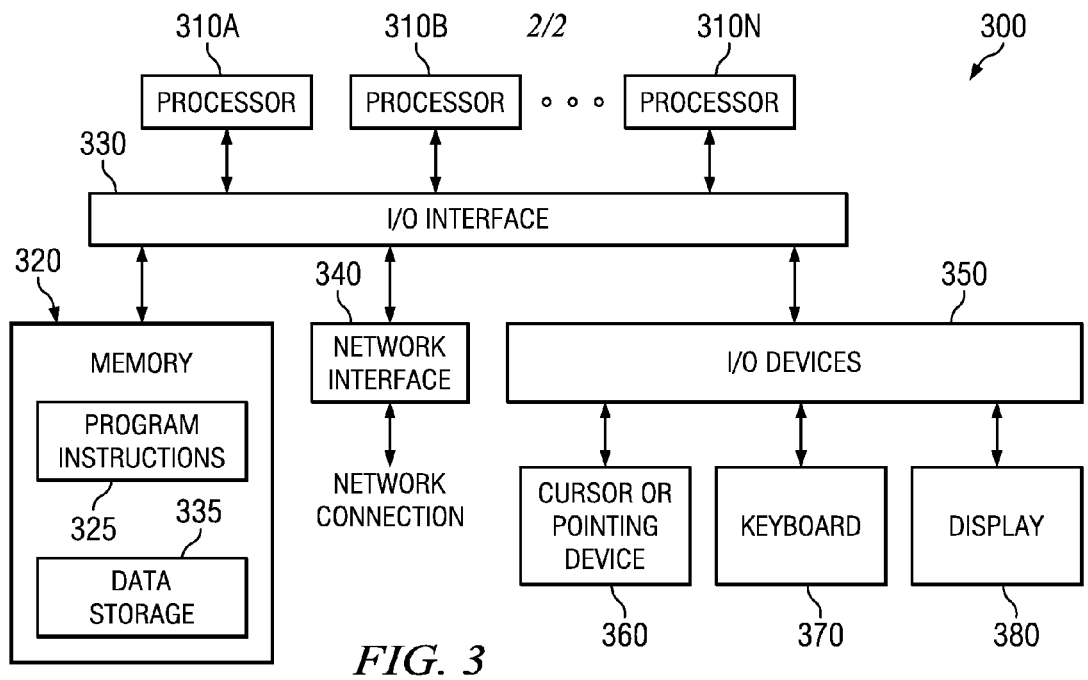
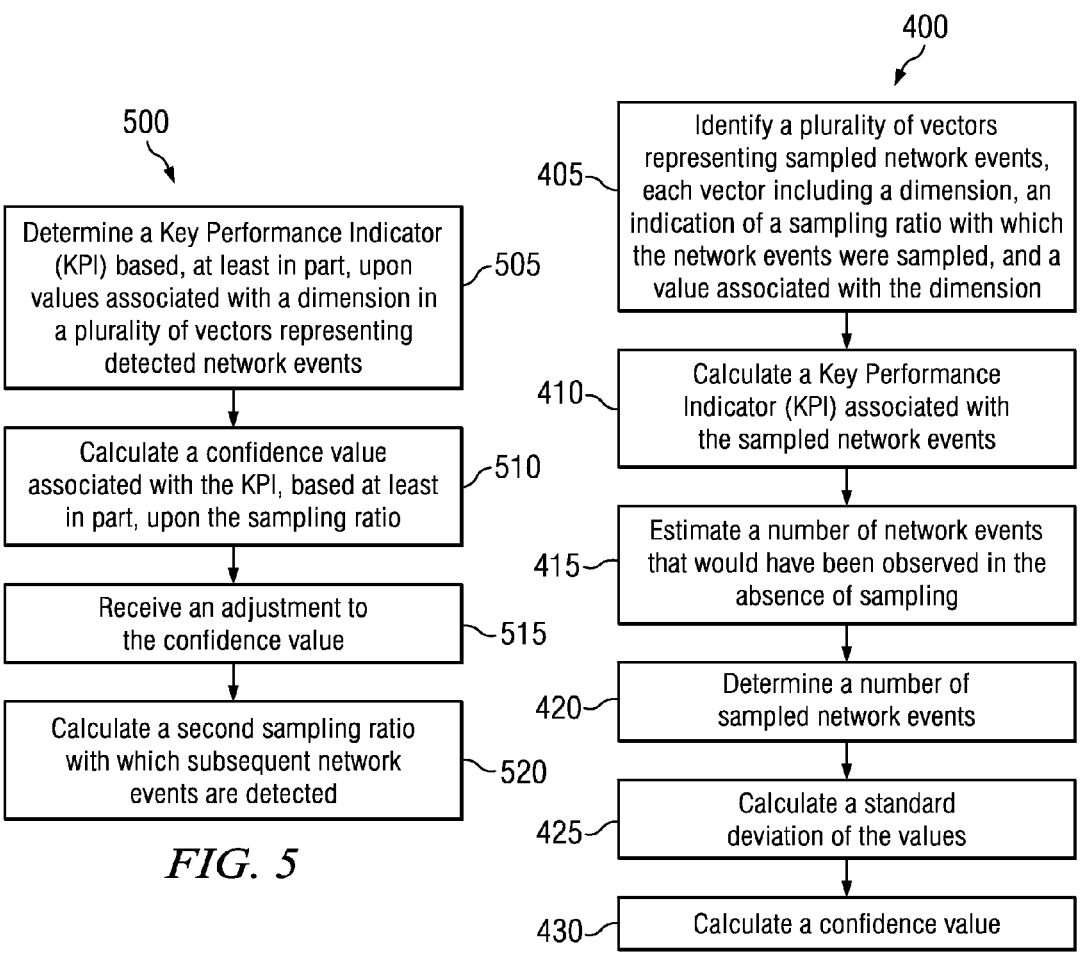

CONFIDENCE INTERVALS FOR KEY PERFORMANCE INDICATORS IN COMMUNICATION NETWORKS

CROSS-REFERENCE TO RELATED APPLICATION

This application claims the benefit of the filing date of U.S. Provisional Patent Application No. 61/580,502 titled "Calculation and/or Presentation of Confidence Intervals for Key Performance Indicators" and filed Dec. 27, 2011, the disclosure of which is hereby incorporated by reference herein in its entirety.

TECHNICAL FIELD

This specification is directed, in general, to network monitoring, and, more particularly, to systems and methods for calculating and presenting confidence interval(s) for key performance indicator(s) (KPIs) in communication networks.

BACKGROUND

Network and customer experience monitoring solutions are widely accepted standards for the operations of carrier service provider networks across both fixed networks (e.g., Cable/MSO, IP broadband such as DSL, FTTH, etc.) and mobile networks (e.g., 2.5G, 3G, LTE, etc.). These systems monitor network traffic via probe devices, then process that traffic through a variety of stages to derive actionable information as it pertains to subscriber experience (quality of service, quality of experience), subscriber behavior (application usage, service usage, etc.), subscriber location, etc. In practice, actionable information may refer to statistical indicators (typically referred to as Key Performance Indicators or KPIs) that are computed from source data processed by the probes, and then made available to various different user constituents at the carrier for the purpose of driving their business process.

A few examples of KPIs include Handover Success (by node, location, etc.), Call Drop Ratio (by node, handset, etc.), Application Usage (by node, subscriber, etc.), Subscriber Count (by location, demographic, etc.), and the like.

As the inventor hereof has recognized, there are multiple macro-level drivers present in the market today that impact the Carrier Service Providers (CSPs) in ways that may affect their deployment and usage of monitoring systems and KPIs. For example, because of downward pressure on subscriber growth, subscriber Average Revenue Per User (ARPU), growing network complexity, etc., CSPs must continually improve operational efficiency. A major way CSPs improve efficiency is by increased reliance on KPIs that embed directly into business processes and automation. That is, CSPs increasingly rely on accurate data to make real-time operational decisions about activity on the network. Also, there is an increasing push for CSPs to leverage data present on their networks to enable new revenue streams. A few examples include using subscriber behavior data to better target additional CSP service offerings, packaging aggregated data about subscriber interests and behaviors to third party advertisers, etc.

Taken together, these drivers mean the following: availability and accuracy of KPIs are more important than ever because KPIs obtained from monitoring systems are increasingly going to trigger network, business, and potentially revenue impacting decisions. As such, the inventor hereof has identified a need for systems and methods that provide the ability to present users with a confidence interval for a given KPI so that they can more fully appreciate the significance of a metric before they take a network or business impacting action. As the inventor hereof has also recognized, however, existing KPI measuring solutions assume that all data is monitored, and that all monitored data is taken into account for KPI calculations. While there are other solutions that use a sampling approach, those systems use a fixed global sampling ratio, which renders the extrapolation of KPIs from observed data a relatively futile exercise.

SUMMARY

Embodiments of systems and methods for calculating and presenting confidence interval(s) for key performance indicator(s) (KPIs) are described herein. In an illustrative, non-limiting embodiment, a method may include identifying vectors representing network events observed by a network monitoring system, each vector including: a dimension, an indication of a sampling ratio with which a respective network event was observed, and a value associated with the dimension. The method may also include calculating a KPI corresponding to the observed network events for the dimension based, at least in part, upon the values, and calculating a confidence associated with the KPI, based, at least in part, upon the sampling ratios.

In some implementations, the dimension may include an International Mobile Equipment Identity (IMEI), International Mobile Subscriber Identity (IMSI), Mobile Station Integrated Services Digital Network (MSISDN), User Agent (UA) Profile, User Agent, Handset Make, Handset Model, Software Version, Uniform Resource Locator (URL), Service, Application, Location, Mobile Country Code (MCC), or Mobile Network Code (MNC), etc. Moreover, the value may include a session length, uplink byte count, downlink byte count, number of attempts, number of failures, or latency.

Furthermore, the dimension may be observed with a first sampling ratio, another dimension may be observed with a second sampling ratio, and the second sampling ratio may be different from the first sampling ratio. Additionally or alternatively, the sampling ratio may include an adaptive sampling ratio controlled by the network monitoring system in response to network or resource loading. Additionally or alternatively, the sampling ratio may vary over time. Additionally or alternatively, the sampling ratio may include a whitelist or blacklist-based differentiated sampling ratio.

In some embodiments, calculating the confidence may include estimating a number of network events ($K_N$) that would have been observed by the network monitoring system in the absence of sampling, determining a number of observed network events ($K_n$), and calculating a standard deviation ($K\sigma$) of the values. The confidence may include a confidence level or a confidence interval, and the confidence level or interval may be based, at least in part, upon $K_N$, $K_n$, and $K\sigma$.

For example, in some cases, calculating the confidence may include identifying a desired confidence level and calculating a confidence interval based, at least in part, upon the desired level. In other cases, calculating the confidence may include identifying a desired confidence interval and calculating a confidence level based, at least in part, upon the desired confidence interval. In addition, the method may also include causing a modification of a sampling ratio with which network events are to be observed in the future based, at least in part, upon a user's adjustment to the confidence level or to the confidence interval.

In another illustrative, non-limiting embodiment, a network monitoring system may include a processor and a memory coupled to the processor, the memory configured to store program instructions executable by the processor to cause the network monitoring system to perform one or more operations. For example, the network monitoring system may identify a plurality of vectors representing sampled network events, each vector including a plurality of dimensions, each of the plurality of dimensions associated with an indication of a sampling ratio with which the respective dimension was sampled, and a value associated with each respective dimension, the sampling ratios being subject to modification over time as a function of network or resource loading. The network monitoring system may also calculate a Key Performance Indicator (KPI) associated with a selected one of the plurality of dimensions based, at least in part, upon an operation performed with respect to respective values, the operation including at least one of a: mean, average, minimum, or maximum. The network monitoring system may further estimate a number of network events ($K_N$) that would have been observed in the absence of sampling, determine a number of sampled network events ($K_n$), calculate a standard deviation ($K\sigma$) of the values, calculate a confidence value associated with the KPI, based, at least in part, upon $K_N$, $K_n$, and $K\sigma$.

In some implementations, the network monitoring system may also display the KPI and/or the confidence value to the user in a graphical and/or textual format. Further, to calculate the confidence value, the network monitoring system may identify a desired confidence level and calculate a confidence interval based, at least in part, upon the desired confidence level. Additionally or alternatively, the network monitoring system may identify a desired confidence interval and calculate a confidence level based, at least in part, upon the desired confidence interval. Also, in some cases, the network monitoring system may automatically modify a sampling ratio with which the selected dimension is to be sampled in subsequent network events based, at least in part, upon an adjustment to the confidence value.

In yet another illustrative, non-limiting embodiment, a tangible electronic storage medium may have program instructions stored thereon that, upon execution by a processor within a computer system, cause the computer system to perform one or more operations. For example, the computer system may determine a KPI based, at least in part, upon values associated with a dimension in a plurality of vectors representing detected network events, the detected network events having been adaptively sampled by a network monitoring system using a sampling ratio.

The computer system may also calculate a confidence value associated with the KPI, based, at least in part, upon the sampling ratio, and it may calculate a second sampling ratio with which subsequent network events are detected based, at least in part, upon a user's adjustment to the confidence value. To the calculate the confidence value, the program instructions may further cause the computer system to estimate a number of network events ($K_N$) that would have been detected in the absence of the variable sampling ratio, determine a number of observed detected events ($K_n$), and calculate a standard deviation ($K\sigma$) of the values.

In some embodiments, one or more of the techniques described herein may be performed by one or more computer systems. In other embodiments, a tangible computer-readable storage medium may have program instructions stored thereon that, upon execution by one or more computer or network monitoring systems, cause the one or more computer systems to perform one or more operations disclosed herein. In yet other embodiments, a system may include at least one processor and a memory coupled to the at least one processor, the memory configured to store program instructions executable by the at least one processor to perform one or more operations disclosed herein.

BRIEF DESCRIPTION OF THE DRAWINGS

Reference will now be made to the accompanying drawings, wherein:

FIG. 3 is a block diagram of a computer system configured to implement various systems and methods described herein according to some embodiments.

FIG. 4 is a flowchart of a method of calculating a confidence value for a Key Performance Indicator (KPI) according to some embodiments.

FIG. 5 is a flowchart of a method of adjusting a sampling ratio to conform KPI results to a desired a confidence value according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Figure 1:
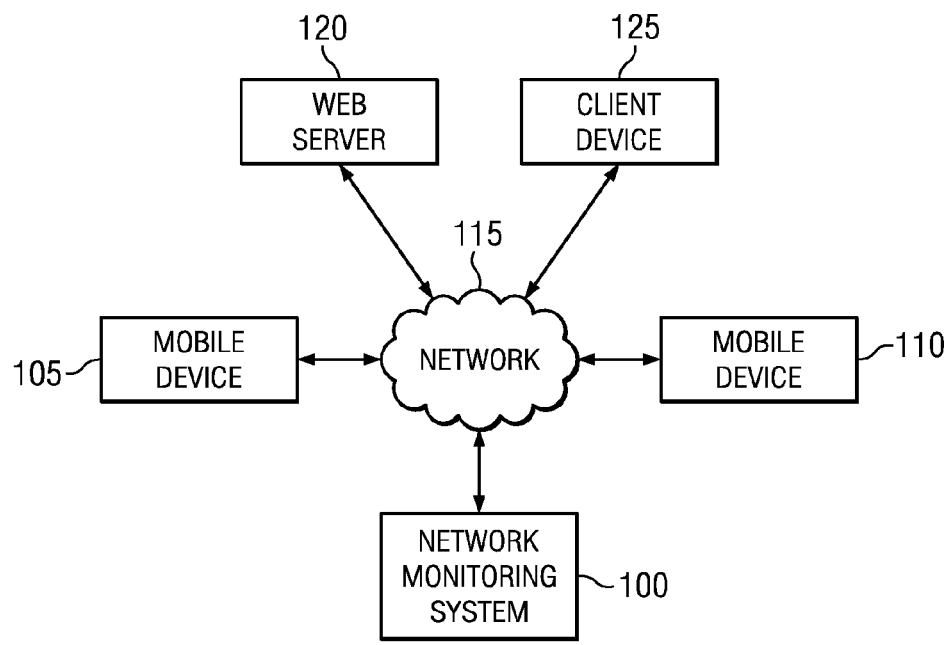
FIG. 1 is a block diagram of a network monitoring system according to some embodiments.

FIG. 1 illustrates a block diagram of a network monitoring system. As illustrated, mobile devices 105 and 110 may be capable of transmitting and receiving data (e.g., web pages, audio, video, etc.) to and from each other over network 115. Also, web server 120 may be configured to provide one or more web pages to client device 125 through network 115. In various embodiments, network 115 may include any suitable wired or wireless/mobile computer or data network including, for example, a third generation (3G), fourth generation (4G), or 3GPP Long Term Evolution (LTE) wireless networks, a voice-over-IP (VoIP) network, an IP Multimedia Subsystem (IMS) network, the Internet, etc.

Communications between mobile devices 105 and 110, as well as communications between web server 120 and client device 125, may be monitored by network monitoring system 100, as data packets comprising those communications pass through network 115. As such, network monitoring system 100 may include a network monitor or analyzer, a packet sniffer, a probe, or the like, coupled to network 115. Protocols used to enable communications taking place in FIG. 1 may be selected, for instance, based upon the type of content being communicated, the type of network 115, and/or the capabilities of devices 105, 110, and/or 125. Examples of types of protocols that may be used include, but are not limited to, HyperText Transfer Protocol (HTTP), Real Time Messaging Protocol (RTMP), and Real-time Transport Protocol (RTP).

Each communication session for the various devices 105, 110, and/or 125 may have different start and stop times, and may be subject to different network traffic constraints. During each session, the available bandwidth for that session may change multiple times. Also, a data stream may start and stop during a given session.

Accordingly, network monitoring system 100 may be configured to sample (e.g., unobtrusively) related data packets for a communication session in order to track the same set of user experience information for each session and each client without regard to the protocol (e.g., HTTP, RTMP, RTP, etc.) used to support the session. For example, by calculating and/or presenting key performance indicator(s) (KPIs), as well as confidence interval(s) for such KPIs, monitoring system 100 may be capable of identifying certain information about each user's experience, as described in more detail below. A service provider may use this information, for instance, to adjust the network services available to client devices 105, 110, and/or 125 such as the bandwidth assigned to each user, and the routing of data packets through network 115.

Generally speaking, client devices 105, 110, and 125 may include any computer system or device such as, for example, a personal computer, laptop computer, tablet computer, mobile device, smart phone, network-enabled devices, web-enabled televisions, and the like. Client devices 105, 110, and 125 may allow users to carry out voice communications, navigate the Internet or other data networks using a web browser application or the like via a Graphical User Interface (GUI), etc. Additionally or alternatively, client device 125 may access a content catalog made available by web server 120 through a stand-alone or web-based client application. Web server 120 may include any server or computer system capable of delivering content to device 125.

Although only devices 105, 110, 120, and 125 are shown in FIG. 1, it will be understood network 115 may comprise any number of nodes and endpoints. For example, in some implementations, network 115 may include nodes or endpoints may be components in a 3G or 4G wireless network, such as a Serving GPRS Support Node (SGSN), Gateway GPRS Support Node (GGSN) or Border Gateway in a General Packet Radio Service (GPRS) network, Packet Data Serving Node (PDSN) in a CDMA2000 network, a Mobile Management Entity (MME) in a Long Term Evolution/Service Architecture Evolution (LTE/SAE) network or any other core network nodes or routers that transfer data packets or messages between endpoints. Moreover, it will be understood that such nodes and endpoints may be interconnected in any suitable manner, including being coupled to one or more other such nodes and/or endpoints.

As noted above, many packets traverse network 115 between endpoints. These packets may represent many different sessions and protocols. For example, if mobile device 105 is used for a voice or video call, then it may exchange Voice over Internet Protocol (VoIP) or Session Initiation Protocol (SIP) data packets with a SIP/VoIP server (not shown) using Real-Time Transport Protocol (RTP). If mobile device 105 is used to send or retrieve email, it may exchange Internet Message Access Protocol (IMAP), Post Office Protocol 3 Protocol (POP3), or Simple Mail Transfer Protocol (SMTP) messages with an email server (not shown). If client device 105 is used to download or stream video, it may use Real Time Streaming Protocol (RTSP) to establish and control media sessions with web server 120. Alternatively, the user at mobile devices 105 and 110 or client device 125 may access a number of websites using Hypertext Transfer Protocol (HTTP) to exchange data packets with web server 120. It will be understood that packets exchanged between devices endpoints may conform to numerous other protocols now known or later developed.

In a typical situation, approximately one percent of the packets traversing network 115 carry control data, such as information for setting-up, managing or tearing-down calls or sessions between endpoints. The other ninety-nine percent of the packets carry user data, such as actual voice, video, email or information content to and from connected devices.

In various embodiments, network monitoring system 100 may be used to monitor the performance of network 115. To that end, monitoring system 100 may be configured to capture packets that are transported across network 115. In some embodiments, packet capture devices may be non-intrusively coupled to network links to capture substantially all of the packets transmitted across the links. It will be understood that, in an actual network, there may be dozens or hundreds of physical, logical or virtual connections and links between nodes. In some cases, network monitoring system 100 may be coupled to all or a high percentage of these links. In other embodiments, monitoring system 100 may be coupled only to a portion of network 115, such as only to links associated with a particular carrier or service provider. The packet capture devices may be part of network monitoring system 100, such as a line interface card, or may be separate components that are remotely coupled to network monitoring system 100 from different locations.

Monitoring system 100 may include one or more processors running one or more software applications that collect, correlate and/or analyze media and signaling data packets from network 115. Monitoring system 100 may incorporate protocol analyzer, session analyzer, and/or traffic analyzer functionality that provides OSI (Open Systems Interconnection) Layer 2 to Layer 7 troubleshooting by characterizing IP traffic by links, nodes, applications and servers on network 115. In some embodiments, these operations may be provided, for example, by the IRIS® toolset available from Tektronix, Inc., although other suitable tools may exist or be later developed. The packet capture devices coupling network monitoring system 100 to network 115 may be high-speed, high-density probes that are optimized to handle high bandwidth IP traffic, such as the GEOPROBE® G10, also available from Tektronix, Inc., although other suitable tools may exist or be later developed. A service provider or network operator may access data from monitoring system 100 via a user interface station having a display or graphical user interface, such as the IRISVIEW configurable software framework that provides a single, integrated platform for several applications, including feeds to customer experience management systems and operation support system (OSS) and business support system (BSS) applications, which is also available from Tektronix, Inc., although other suitable tools may exist or be later developed.

Monitoring system 100 may further comprise an internal or external memory for storing captured data packets, user session data, and configuration information. Monitoring system 100 may capture and correlate the packets associated with specific data sessions. In some embodiments, related packets may be correlated and combined into a record for a particular flow, session or call on network 115. These data packets or messages may be captured in capture files. A call trace application may be used to categorize messages into calls and to create Call Detail Records (CDRs). These calls may belong to scenarios that are based on or defined by the underlying network. In an illustrative, non-limiting example, related packets can be correlated using a 5-tuple association mechanism. Such a 5-tuple association process may use an IP correlation key that includes 5 parts: server IP address, client IP address, source port, destination port, and Layer 4 Protocol (Transmission Control Protocol (TCP), User Datagram Protocol (UDP) or Stream Control Transmission Protocol (SCTP)).

Accordingly, network monitoring system 100 may be configured to sample (e.g., unobtrusively) related data packets for a communication session in order to track the same set of user experience information for each session and each client without regard to the protocol (e.g., HTTP, RTMP, RTP, etc.) used to support the session. For example, monitoring system 100 may be capable of identifying certain information about each user's experience, as described in more detail below. A service provider may use this information, for instance, to adjust network services available to endpoints 105, 110, 120, and/or 125 such as the bandwidth assigned to each user, and the routing of data packets through network 115.

As the capability of network 115 increases toward 10 Gigabits/second (Gbps) and beyond (e.g., 100 Gbps), however, it supports more users' flows and sessions. As such, it becomes difficult for a service provider or network operator to analyze all the traffic across network 115, for example, to identify problem nodes or links. Some systems may collect all the data for a relatively short period of time, hoping that the sample taken is representative. Other systems may collect a percentage of network traffic all the time and attempt to extrapolate the data for the entire network by simply scaling it. To address these and other concerns, certain systems and methods described herein may enable the adaptive monitoring of telecommunications networks.

Figure 2:
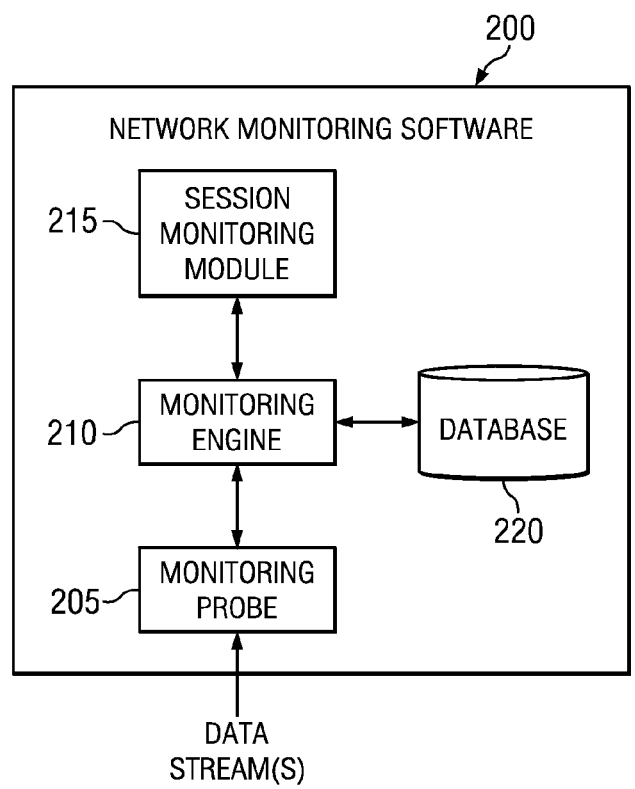
FIG. 2 is a block diagram of a network monitoring software program according to some embodiments.

Turning now to FIG. 2, a block diagram of a network monitoring software program is depicted. In some embodiments, network monitoring software 200 may be a software application executable by monitoring system 100 of FIG. 1. As previously noted, a plurality of communication sessions or data streams may be transmitted across network 115 between devices 105, 110, 120, and/or 125. Such communications may be streamed over HTTP, RTMP, RTP, or any other suitable protocols.

Monitoring probe 205 may be configured to capture data packets from network 115, including, for example, data from one or more HTTP requests or sessions. As such, monitoring probe 205 may determine identifying information for the captured data packets and may combine related data into session or request records. Monitoring probe 205 may then feed session records and captured packet data to monitoring engine 210. In some cases, a session record may include multiple segments that are provided to monitoring engine 210 periodically while an associated session is active. Monitoring engine 210 may in turn be configured to extract session data from each session record and to identify the protocol for each session record.

Session data may be provided as a monitoring feed to session monitoring module 215 and/or may be stored to database 220. Database 220 may also store subscriber information and client device data.

Network monitoring software 200 may allow the service provider for network 115 to collect data from various HTTP requests or sessions concurrently or simultaneously. Data for multiple requests or sessions is stored in database 220, which allows the service provider to track each session or to extract system-wide parameters. For example, monitoring probe 205 and/or monitoring engine 210 may identify the type of protocol being used for each session by analyzing the header of one or more data packets for that session.

Monitoring probe 205 and/or monitoring engine 210 may also track the bandwidth available to each VoIP session, and may identify bandwidth changes that occur in real-time. Moreover, monitoring probe 205 and/or monitoring engine 210 may detect when gaps or missing fragments occur in the stream of data packets for any of the requests or sessions. The requests or sessions parameters, bandwidth information, and gap data may be collected to database 200 and/or presented to the service provider.

Data stored in database 220 may be queried by the service provider, for example, on a per-session, per-user, per-device, or per-protocol basis. Session monitoring module 210 may use the collected information to generate Quality-of-Experience (QoE) and Key-Quality-Indicators (KQIs) for each session and for the overall network. The QoE and KQIs may be based, for example, on how often re-buffering, screen resolution changes, gaps, and/or missing fragments are detected. Excessive buffering during the session (i.e. re-buffering), numerous screen resolution changes, and gaps in the VoIP stream may lower a user's QoE.

Referring back to FIGS. 1 and 2, network monitoring system 100 may be configured via network monitoring software 200 to monitor a programmable fraction of the network traffic that it is tapped into (e.g., 10 Gbps, 100 Gpbs, etc.). Such a programmable portion may be defined, for example, by a sampling ratio or the like. In some cases, monitoring probe 205 and/or engine 210 may analyze traffic intelligently to distinguish high-value traffic from low-value traffic (or any other selected forms traffic) based on a set of heuristics. Examples of such heuristics may include, but are not limited to, traffic having a common source or destination address, a common subscriber identifier, a common transport protocol, a common port number, a common content type, etc. Depending upon the different type of traffic, a different sampling rule (or set of rules) may apply. Each rule may in turn dictate a portion of that traffic that will be used in subsequent processing such as, for example, the calculation of KPIs or the like. Examples of KPIs may include, but are not limited to, service performance indicators, network congestion indicators, connection maintenance indicators, service quality indicators, and/or network availability indicators.

Network monitoring system 100, under control of software 200, may also be configured to aggregate data to enable backhauling, to generate netflows and basic KPI calculations, time stamping of data, port stamping of data, filtering out unwanted data, protocol classification, and deep packet inspection (DPI) analysis. In addition, network monitoring system 100, may be further configured to perform stateful analysis of data, extraction of key parameters for call correlation and generation of call data records (CDRs), application specific processing, etc.

In operation, monitoring engine 210 may be configured to receive load information (e.g., CPU and/or memory usage) and to store that information in database 220. It may also be configured to create and/or modify sampling rules stored in database 220. Based upon load information and/or network condition determinations, monitoring engine 210 may adaptively modify one or more aspects of the rules stored in database 220, as well as update monitoring probe 205 with modified filters, priority codes, sampling ratios, etc.

An example of hypothetical sampling rules that may be stored in database 220 is provided in Table I below for purposes of illustration:

TABLE I

| Rule | Condition | Priority | Sampling Ratio |
|---|---|---|---|
| 1 | Subscriber = {A, B, or C} | 0 | SR = 100% |
| 2 | Subscriber = {D, E, or F} | 1 | SR = 1% |

In this example, monitoring engine 210 may receive or store Rule 1 in database 220 such that, for any packets associated with subscribers A, B, or C, the sampling ratio is 100%. As to Rule 2, for packets identifying subscribers D, E, or F, the sampling ratio is 1%. Thus, in this case, every packet (i.e., SR=100%) detected by network monitoring system 100 from and/or to subscribers A, B, and C may be used in subsequent processing such as, for example, to calculate KPIs associated with such traffic. Conversely, only 1% of the packets detected from or to subscribers D, E, and F are used in KPI calculations for that traffic. In some implementations, Rule 1 may be applied with respect to important customers, whereas Rule 2 may be applied with respect to less critical subscribers—also known as "whitelisting" or "VIP monitoring." Conversely, sampling rules may be set up such that subscribers have their events and/or dimensions sampled at a high or relatively high rate (e.g., 100%) by default, but selected subscribers are "blacklisted" and their events/dimensions are sampled at lower ratios.

When KPI parameters are calculated based upon sampled packets following each rule (and respective sampling ratios), each such parameter may be associated with a statistical confidence level or the like. In general, as a given sampling ratio decreases, the confidence level associated with a respective KPI parameter also tends to decrease. Conversely, as the sampling ratio increases, the confidence factor increases as well. In various embodiments, statistical confidence values may be calculated as described with respect to FIGS. 4 and 5 below.

Embodiments of network monitoring system 100 may be implemented or executed by one or more computer systems. One such computer system is illustrated in FIG. 3. In various embodiments, computer system 300 may be a server, a mainframe computer system, a workstation, a network computer, a desktop computer, a laptop, or the like. For example, in some cases, network monitoring system 100 shown in FIG. 1 may be implemented as computer system 300. Moreover, one or more of streaming server 120 or devices 105, 110, and 125 may include one or more computers in the form of computer system 300. As explained above, in different embodiments these various computer systems may be configured to communicate with each other in any suitable way, such as, for example, via network 115.

As illustrated, computer system 300 includes one or more processors 310 coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In some embodiments, a given entity (e.g., network monitoring system 110) may be implemented using a single instance of computer system 300, while in other embodiments multiple such systems, or multiple nodes making up computer system 300, may be configured to host different portions or instances of embodiments. For example, in an embodiment some elements may be implemented via one or more nodes of computer system 300 that are distinct from those nodes implementing other elements (e.g., a first computer system may implement monitoring probe 205 while another computer system may implement monitoring engine 210).

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations as described herein may be stored within system memory 320 as program instructions 325 and data storage 335, respectively. In other embodiments, program instructions and/or data may be received, sent or stored upon different types of computer-accessible media or on similar media separate from system memory 320 or computer system 300. Generally speaking, a computer-accessible medium may include any tangible storage media or memory media such as magnetic or optical media—e.g., disk or CD/DVD-ROM coupled to computer system 300 via I/O interface 330. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 340.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to network 115, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touch screens, scanning devices, voice or optical recognition devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data accessible by program instructions 325. In an embodiment, program instructions 325 may include software elements of embodiments illustrated in FIG. 2. For example, program instructions 325 may be implemented in various embodiments using any desired programming language, scripting language, or combination of programming languages and/or scripting languages (e.g., C, C++, C#, JAVA®, JAVASCRIPT®, PERL®, etc). Data storage 335 may include data that may be used in these embodiments. In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

In some embodiments, the systems described above may be configured to perform one or more of methods for calculating KPIs, as well as confidence level(s) or interval(s) for KPIs. For example, assume that monitoring probe 205 in network monitoring system 100 generates, for each observed network event ("event"), the following network event vector ("event vector" or "vector"):

$(T, D_1, D_2, \ldots, D_n, V_0=1, V_1, V_2, \ldots V_n)$ where T is an event time, $D_X$ is a dimension, and $V_X$ is a value. Specifically, dimensions are fields present by which a KPI may be aggregated or viewed. Examples of "dimensions" may include, but are not limited to, subscriber (e.g., by International Mobile Subscriber Identity or IMSI, International Mobile Equipment Identity or IMEI, Mobile Subscriber Integrated Services Digital Network Number or MSISDN, etc.), cell, node, handset make, handset model, software version (e.g., operating system, web browser, etc.), User Agent (UA), UA profile, service, application, location, release code, Uniform Resource Locator (URL), Mobile Country Code (MCC), Mobile Network Code (MNC), etc. Meanwhile, a "value" may include any suitable numeric value that may be manipulated, aggregated, etc. to create a KPI. Examples of values may include: latency, byte counts (uplink and/or downlink), throughput, session length, number of attempts (e.g., connection attempts), number of failures (e.g., connection failures), etc. In the example shown above, $V_0=1$ may be used as a counter—i.e., it represents the occurrence of the event itself for the purpose of simple count KPIs (e.g., count of events with release cause X can be represented as sum($V_0$) where $D_{RC}=X$).

An intelligent and/or adaptive sampling system, such as the one described in connection with FIGS. 1-3, may sample network events in several different modalities—some examples include adaptive random sampling, whitelist differentiated sampling, etc. Again, adaptive random sampling may use random sampling, but adaptively adjust ratio based on resource loading (i.e., at low traffic sampling ratio will be higher than at high traffic times). In effect, in this mode the sampling ratio varies across the time dimension. Conversely, in whitelist differentiated sampling, for any given dimension, the system may sample events in the whitelist at one ratio ($R_1$) and events not in the whitelist at a different ratio ($R_2$). For example, to implement a VIP monitoring capability, a system may provide a subscriber whitelist against the proper dimension, then set $R_1$ to 100% and $R_2$ to 1%. If we assume that VIPs constitute 1% of the total subscriber population, then this monitoring configuration is only doing detailed processing for ~1% of the traffic and yet can still yield highly actionable and accurate KPIs, if calculated and presented in a proper way.

Now, assume the case of whitelist differentiated sampling for VIP subscribers (whitelist International Mobile Subscriber Identity or IMSI=100-199) where $R_1$=100% and $R_2$=1%, and consider this example set of output vectors:

Vector 1: ($T_1$, $D_1$-IMSI=101, D2-HANDSET=H1, V0=1, V1-Latency=2)

Vector 2: (T2, D1-IMSI=151, D2-HANDSET=H2, V0=1, V1-Latency=5)

Vector 3: (T3, D1-IMSI=368, D2-HANDSET=H1, V0=1, V1-Latency=110)

Vector 4: (T4, D1-IMSI=499, $D_2$-HANDSET=$H_3$, $V_0$=1, $V_1$-Latency=89)

Then, consider different KPIs that may be computed based on vectors 1-4 (e.g., for a given time range), including, but not limited to:

Example A—Overall average latency: a proper calculation is the mean of the latency values in the sample set. If we assume a typical distribution of the latency values (e.g., a Normal distribution), the techniques described herein enable calculation of a confidence factor (e.g., level and/or interval) for the latency KPI.

Example B—Average latency for subscriber IMSI 101: In this example, IMSI 101 is in the "whitelist," and therefore all of its data is assumed to be present—i.e., it was sampled with a 100% sampling ratio. Using the techniques described herein, the statistics aggregation and presentation layers may reflect what is essentially a perfect confidence interval (i.e., +/−0) or level (e.g., 100%).

Example C—Average latency for subscriber IMSI 368: This is example the same type of KPI statement as in Example B, but since the requested subscriber is not in the whitelist the system knows that the data has been sampled. In this illustrative case, the value would simply be reported as 110, and a confidence factor may be computed and may reflect the appropriate uncertainty.

Example D—Count of users with HANDSET $H_1$—For proper calculation in this case, the system may count users (i.e., sum($V_0$)) in the VIP subscriber group then add to it the count of remaining $H_1$ users multiplied by 1/sampling ratio.

In some embodiments, a monitoring system may have knowledge of the conditions under which an event was observed and reported. To accomplish this, we may introduce a set of values DSx that parallel the dimensions in the event vectors.

(T, $D_1$, $D_2$, ..., $D_n$, $DS_T$, $DS_1$, $DS_2$, ..., $DS_n$, $V_0$=1, $V_1$, $V_2$, ..., $V_n$)

Each DSx may carry or otherwise indicate the sampling ratio by which that dimension was sampled for this event, which this supports a general sampling model where each dimension can carry its own multi-tiered/whitelisted sampling policy, however, in some cases, a model may assumed where a single primary dimension is the sampled dimension and all other dimensions are dependent. In other cases, such a model may be extended to support any number of primary sample dimensions simultaneously active.

In this case, vectors 1-4 above may now become:

Vector 1: ($T_1$, D1-IMSI=101, D2-HANDSET=H1, DST=0.01, DS1=1.0, DS2=0.01, V0=1, V1-Latency=2)

Vector 2: (T2, D1-IMSI=151, D2-HANDSET=H2, DST=0.01, DS1=1.0, DS2=0.01, V0=1, V1-Latency=5)

Vector 3: (T3, D1-IMSI=368, D2-HANDSET=H1, DST=0.01, DS1=0.01, DS2=0.01, V0=1, V1-Latency=110)

Vector 4: (T4, D1-IMSI=499, D2-HANDSET=H3, DST=0.01, DS1=0.01, DS2=0.01, V0=1, V1-Latency=89)

Vectors 1 and 2 carry sampling ratios of 1.0 in $DS_1$, thus indicating that those IMSI values passed the whitelist and thus data is 100% present. All other DSx values are 0.01, which reflect the default sampling ratio in this particular example. It is also noted that the DSx values may often be redundant if carried individually in the vectors. Accordingly, in some cases, DSx values may, instead of carrying the actual sampling rate, be coded such that they represent or indicate a sampling rates stored elsewhere (e.g., a different table a database 220). For example, each vector in a table of event vectors may include a DSx pointer to a corresponding entry in a table of sampling rates (in relational manner, or the like). More generally, it should be noted that the systems and methods described herein are not limited to the examples above, which are provided for sake of illustration only, but rather the same or similar information may be made available in other suitable fashion, thus resulting in different specific implementations.

In some embodiments, a KPI aggregation engine (e.g., within monitoring engine 210) may use the DSx sampling ratios to properly calculate KPIs. Assume that the generic representation of a KPI is:

($\Delta T$, $D_1$, $D_2$, ..., $D_n$, K)

In contrast with event vectors or descriptors, instead of a time value, KPIs may be calculated for a specific time range $\Delta T$. Also, KPIs may be computed per a set of dimensions— e.g., a subset of dimensions that were present in the event records. Moreover, KPIs computations typically yields a single value or result K, although it is quite common in implementations to compute a set of KPIs for the same dimensions and time ranges. As demonstrated above, both to properly calculate K as well as be able to represent the actual confidence interval for the user, additional information may be used. Particularly, KPIs for an adaptive sampling system may be represented as:

($\Delta T$, $D_1$, $D_2$, ..., $D_n$, K, $K_N$, $K_n$, $K_O$)

where K represents the calculated KPI value (which is the general case is the sample mean), $K_N$ represents the number of events in the total population if no sampling had occurred, $K_n$ represents the number of samples present for this KPI calculation, and $K_O$ represents the standard deviation of the observed sampled values. To properly calculate the KPI values for the adaptive sampling system, some additional logic may be used that is specific to different KPI types:

For sum-based KPIs, for example, in order to obtain or estimate a sample set, an algorithm may select (Vx*1/DSx) from the table of event vectors, where (Dx=X, Dy=Y, ...), and T in $\Delta Y$. That is, results or values are scaled by the sampling ratio(s). For mean-based KPIs, to obtain or estimate a sample set, an algorithm may select (Vx) from the table of event vectors, where (Dx=X, Dy=Y, ...), and T in $\Delta Y$. In both cases, to obtain or estimate the population size $K_N$, the algorithm may select sum(1/DSx) from the table of event vectors, where (Dx=X, Dy=Y, ...), and T in $\Delta Y$. As such, K represents the mean (sample set), $K_N$ represents the population size, $K_n$ represents the count (sample set), and $K_O$ represents the std-dev (sample set).

With the additional calculations stored with the KPI, the system has enough information to either report a confidence interval (i.e., +/−X) given a target confidence factor, or to report a confidence factor (i.e., 95%) for a given interval range using the following formula:

$$X \pm t_{n-1} \frac{S}{\sqrt{n}} \sqrt{\frac{N-n}{N-1}}$$

where X represents the KPI result (K) or sample mean of corresponding values in the event vectors, $t_{n-1}$ is the "t" value obtained from standard statistical or distribution tables, S is the sample standard deviation ($K_O$), n is the sample size ($K_n$), and N is the population size ($K_N$). Note the variant including finite population correction (fpc) factor (i.e., the fraction inside the radical) is used in "non-sampled" cases (i.e., sampling off whitelist sampling, etc.). Now, let:

$$A = \frac{s}{\sqrt{n}} \sqrt{\frac{N-n}{N-1}}$$

In some embodiments, a user may set a confidence level (i.e., 95%), which determines the t value and in turn determines a confidence interval equal to: $+/-t_{n-1}A$. Additionally or alternatively, the user can set an interval (X) and the confidence level is the associated t value for X/A.

In sum, once the sampling conditions with which particular events were observed or detected are identified in their corresponding vectors, it is possible to calculate a confidence factor or value associated with a KPI that is derived from those vectors. FIG. 4 is a flowchart of a method of calculating a confidence value for a KPI. In some embodiments, method 400 may be performed, at least in part, by network monitoring system 100. At block 405, method 400 may identify a plurality of vectors representing observed, detected, or sampled network events, each vector including one or more dimensions, an indication of a sampling ratio with which the network events were observed, detected, or sampled, and a value associated with each dimension. For example, the sampling ratio may be subject to modification over time as a function of network or resource loading, as a function of a white- or black-listing protocol, etc. Also, in the same vector, a given dimension may be observed with a first sampling ratio while another dimension may be observed with a different, second sampling ratio.

At block 410, method 400 may calculate a KPI associated with the sampled network events, for example, for a selected dimension(s). For instance, the KPI may be calculated based upon an operation (e.g., mean, average, minimum, maximum, etc.) performed with respect to the values reported in the vectors corresponding to the selected dimension(s). At block 415, method 400 may estimate a number of network events ($K_N$) that would have been observed in the absence of sampling. At block 420, method 400 may determine a number of sampled network events ($K_n$). At block 425, method 400 may calculate a standard deviation ($K\sigma$) of the values. And at block 430, method 400 may calculate a confidence value associated with the KPI, based, at least in part, upon $K_N$, $K_n$, and $K\sigma$.

Confidence intervals and/or levels may then be displayed to the user for visualization along with the KPI value. In some embodiments, such visualization may be graphically displayed on a computer screen. For example, shaded bars may extend above and below the value on a KPI graph. The visualization may also be textual (e.g., a +/− value represented next to the KPI value, etc.). It should be understood, however, that, the systems and methods described herein are not limited to any one particular type of visualization, and other variations will be apparent in light of this disclosure.

As such, the systems and methods described herein may present an integrated (and properly calculated) confidence interval for the purpose of data integrity assessment or the like. Furthermore, the systems and methods described herein may address core customer business problems and many customer satisfaction issues, given their broad application (product/system level).

In some embodiments, once a KPI and an associated confidence level and/or interval are presented to a user, the user may desire to adjust that confidence value (e.g., in order to make a business decision, it may want to know a particular KPI or set of KPIs with greater accuracy). Generally speaking, the confidence of a calculated KPI is a function of the sampling rate with which network events are recorded, detected, or observed. Accordingly, FIG. 5 shows a flowchart of a method of adjusting a sampling ratio to conform KPI results to a desired a confidence value. In some embodiments, method 500 may be performed, at least in part, by network monitoring system 100. At block 505, method 500 may determine a KPI based, at least in part, upon values associated with a dimension in a plurality of vectors representing detected network events. For example, detected network events may have been adaptively sampled by a network monitoring system using a sampling ratio, or the like.

At block 510, method 500 may calculate a confidence value associated with the KPI, based, at least in part, upon the sampling ratio, as described above. At block 515, method may receive an adjustment or modification to the confidence value. Such an adjustment may be received from a user or customer (e.g., in the form of a desired value), it may be pre-established, and/or it may be automatically determined by network monitoring system 100 following one or more rules (e.g., reporting rules setting minimum or target confidence values for certain KPIs). Then, at block 520, method 500 may calculate a second sampling ratio with which subsequent network events are detected based, at least in part, upon the adjustment to the confidence value. In some cases, the second sampling ratio may be determined iteratively by detecting or observing future network events with another sampling rate, calculating the new confidence value, adjusting the sampling ratio (e.g., as a function of the difference between the new confidence value and a desired value), and repeating the process one or more times. Additionally or alternatively, existing vectors may be used in a simulated fashion by changing one or more of their observed parameters and calculating the target sampling ratio based on those variations—e.g., prior to instructing monitoring probe 205 to change the sampling ratio for subsequent network events.

The various techniques described herein may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A method, comprising:
performing, using one or more computer systems,
identifying vectors representing network events observed by a network monitoring system, each vector including: a dimension, an indication of a sampling ratio with which a respective network event was observed, and a value associated with the dimension;
calculating a Key Performance Indicator (KPI) corresponding to the observed network events for the dimension based, at least in part, upon the values; and
calculating a confidence associated with the KPI, based, at least in part, upon the sampling ratios, wherein calculating the confidence further includes:
performing, using the one or more computer systems,
estimating a number of network events (KN) that would have been observed by the network monitoring system in the absence of sampling;
determining a number of observed network events (Kn); and
calculating a standard deviation ($K\sigma$) of the values.

2. The method of claim 1, wherein the dimension includes at least one of: International Mobile Equipment Identity (IMEI), International Mobile Subscriber Identity (IMSI), Mobile Station Integrated Services Digital Network (MSISDN), User Agent (UA) Profile, User Agent, Handset Make, Handset Model, Software Version, Uniform Resource Locator (URL), Service, Application, Location, Mobile Country Code (MCC), or Mobile Network Code (MNC).

3. The method of claim 1, wherein the dimension is observed with a first sampling ratio, wherein another dimension is observed with a second sampling ratio, and wherein the second sampling ratio is different from the first sampling ratio.

4. The method of claim 1, wherein the sampling ratio includes an adaptive sampling ratio controlled by the network monitoring system in response to network or resource loading.

5. The method of claim 1, wherein the sampling ratio varies over time.

6. The method of claim 1, wherein the sampling ratio includes a whitelist or blacklist-based differentiated sampling ratio.

7. The method of claim 1, wherein the value includes at least one of: session length, uplink byte count, downlink byte count, number of attempts, number of failures, or latency.

8. The method of claim 1, wherein the confidence includes at least one of: a confidence level or a confidence interval, and wherein the confidence level or the confidence interval is based, at least in part, upon KN, Kn, and $K\sigma$.

9. The method of claim 8, wherein calculating the confidence further comprises:
performing, using the one or more computer systems,
identifying a desired confidence level; and
calculating a confidence interval based, at least in part, upon the desired confidence level.

10. The method of claim 8, wherein calculating the confidence further comprises:
performing, using the one or more computer systems, identifying a desired confidence interval; and
calculating a confidence level based, at least in part, upon the desired confidence interval.

11. The method of claim 8, further comprising:
performing, using the one or more computer systems, causing a modification of a sampling ratio with which network events are to be observed in the future based, at least in part, upon a user's adjustment to the confidence level or to the confidence interval.

12. A network monitoring system, comprising:
a processor; and
a memory coupled to the processor, the memory configured to store program instructions executable by the processor to cause the network monitoring system to:
identify a plurality of vectors representing sampled network events, each vector including a plurality of dimensions, each of the plurality of dimensions associated with an indication of a sampling ratio with which the respective dimension was sampled, and a value associated with each respective dimension, the sampling ratios being subject to modification over time as a function of network or resource loading;
calculate a Key Performance Indicator (KPI) associated with a selected one of the plurality of dimensions based, at least in part, upon an operation performed with respect to respective values, the operation including at least one of a: mean, average, minimum, or maximum;
estimate a number of network events (KN) that would have been observed in the absence of sampling;
determine a number of sampled network events (Kn);
calculate a standard deviation (K$\sigma$) of the values;
calculate a confidence value associated with the KPI, based, at least in part, upon KN, Kn, and K$\sigma$;
display the KPI to a user; and
display the confidence value to the user in a graphical or textual format.

13. The network monitoring system of claim 12, wherein to calculate the confidence value, the program instructions are further executable by the processor to cause the network monitoring system to:
identify a desired confidence level; and
calculate a confidence interval based, at least in part, upon the desired confidence level.

14. The network monitoring system of claim 12, wherein to calculate the confidence value, the program instructions are further executable by the processor to cause the network monitoring system to:
identify a desired confidence interval; and
calculate a confidence level based, at least in part, upon the desired confidence interval.

15. The network monitoring system of claim 12, the program instructions further executable by the processor to cause the network monitoring system to automatically modify a sampling ratio with which the selected dimension is to be sampled in subsequent network events based, at least in part, upon an adjustment to the confidence value.

* * * * *